No. 821,570. PATENTED MAY 22, 1906.
B. J. ABBOTT.
CLUTCH MECHANISM.
APPLICATION FILED FEB. 26, 1903.
2 SHEETS—SHEET 1.
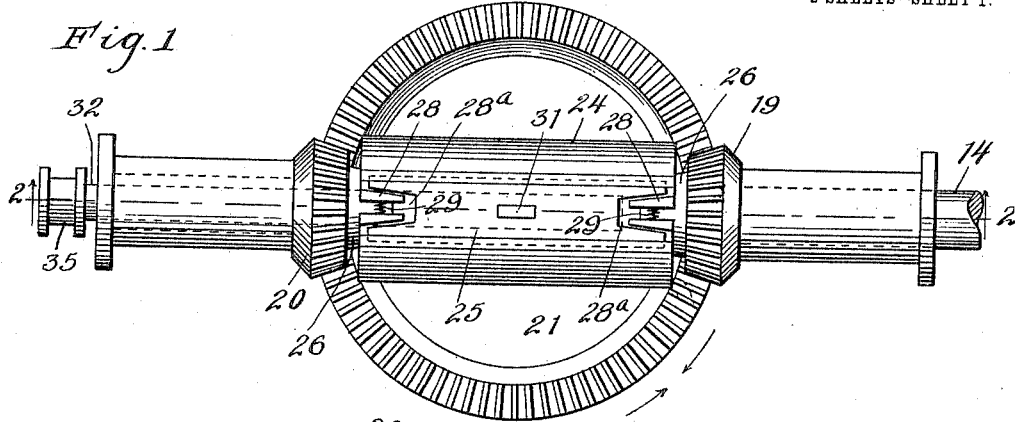
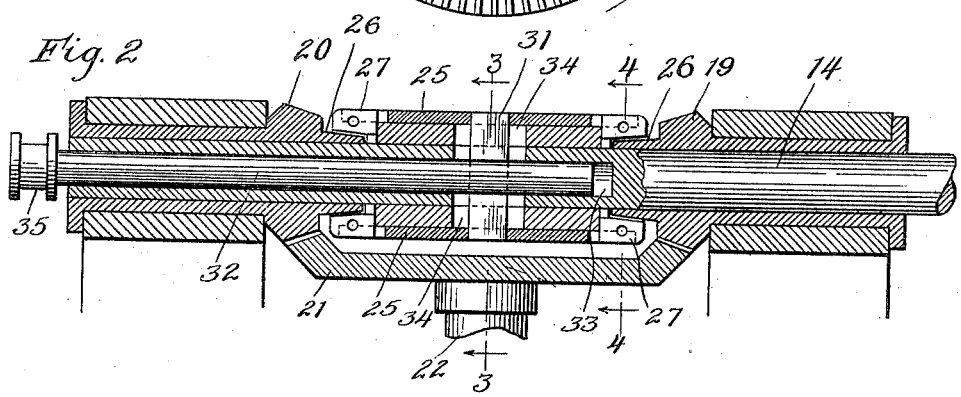
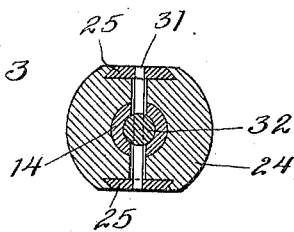 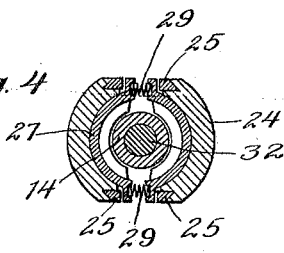
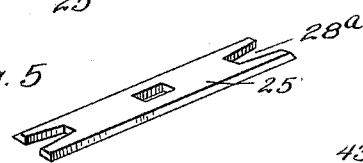
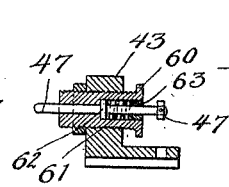 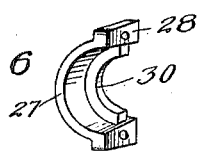
Witnesses:
Wm. Geiger
H. W. Munday
Inventor:
Benjamin Judd Abbott
By Munday, Evarts & Adcock.
Attorneys No. 821,570. PATENTED MAY 22, 1906.
B. J. ABBOTT.
CLUTCH MECHANISM.
APPLICATION FILED FEB. 26, 1903.
2 SHEETS—SHEET 2.
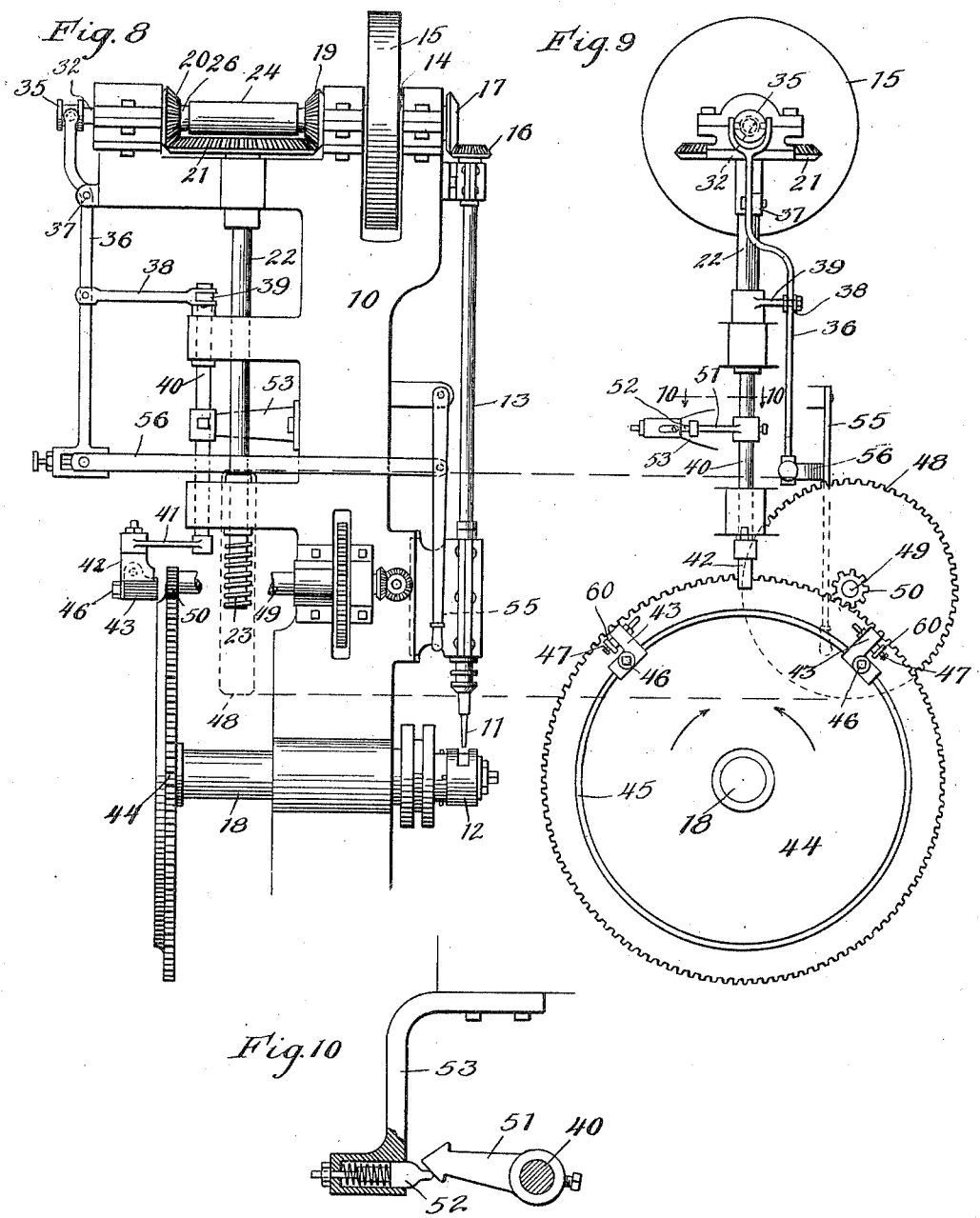
Witnesses:
Wm. Geiger
H. W. Munday
Inventor.
Benjamin Judd Abbott
By Munday, Evarts & Adcock.
Attorneys

UNITED STATES PATENT OFFICE.

BENJAMIN J. ABBOTT, OF CHICAGO, ILLINOIS, ASSIGNOR TO UNION HORSE NAIL COMPANY, A CORPORATION OF CONNECTICUT.

CLUTCH MECHANISM.

No. 821,570.  Specification of Letters Patent.  Patented May 22, 1906.

Application filed February 26, 1903. Serial No. 145,124.

*To all whom it may concern:*

Be it known that I, BENJAMIN JUDD ABBOTT, a citizen of the United States, residing in Chicago, in the county of Cook and State of Illinois, have invented a new and useful Improvement in Clutch Mechanisms, of which the following is a specification.

This invention relates to the clutch mechanism employed in the engraving-machine patented to me in Patent No. 593,556, dated November 16, 1897, and being a part of the reversing mechanism by which the rotation of the work-holder shaft is controlled. Although the invention was devised with special reference to use in said machine, it is by no means limited to such use, as it can be employed wherever a very sensitive and positively-acting clutch is needed.

My object in the invention has been to obtain a marked increase in the sensitiveness of the clutch over previous constructions without any loss in its power or efficiency and without rendering it any less speedy in taking hold and releasing than the prior constructions.

The nature of the improvement is fully set forth below and also illustrated in the accompanying drawings, in which—

Figure 1 is a plan of my improved clutch. Fig. 2 is a section thereof in the line 2 2 of Fig. 1. Figs. 3 and 4 are detail sections on the lines 3 3 and 4 4, respectively, of Fig. 2. Fig. 5 is a perspective of one of the slides employed to close the clutch. Fig. 6 is a like view of one of the clamping half-rings. Fig. 7 is a detail section of one of the stops carried by the work-actuating gear. Fig. 8 is a side elevation, and Fig. 9 is a rear elevation, of an engraving-machine embodying my invention; and Fig. 10 is a detail section on the line 10 10 of Fig. 9.

In said drawings, 10 represents the frame of the machine, 11 the milling or engraving tool, and 12 the cylinder or collar being operated upon. The tool is rotated and supported by the vertical shaft 13, driven from shaft 14 of the drive-pulley 15 by the bevel-gears 16 and 17. The work is supported on the shaft 18, which is given partial rotations alternately in opposite directions through the medium of my improved clutch and connecting mechanism. These alternate and opposite movements are communicated to shaft 18 by means of the devices now to be described.

Mounted loosely upon shaft 14 are two bevel-pinions 19 and 20 at opposite sides of a horizontal bevel-gear 21 on the top of a vertical shaft 22, carrying a worm 23. The pinions are in constant mesh with gear 21 and actuate it first in one direction and then in the other, according to which of the two pinions is clutched to the shaft 14, which, as will be understood, rotates continuously in one direction. Surrounding the shaft 14 between the two pinions is a sleeve 24, fast on the shaft and provided with dovetail longitudinal recesses or grooves on two of its opposite sides, in which the plates or slides 25 25 are positioned. The pinions are provided with tapering hubs or bosses 26 at the sides adjacent the sleeve 24, and on each of these hubs are placed correspondingly-tapered clutching half-rings or sections 27, having ears 28 at their ends lying within V-shaped notches 28ª, formed at the ends of the slides 25. Springs 29 are inserted between the ears 28 of the ring-sections 27, which act to keep them normally spread and out of contact with the hubs 26. The half-rings are encircled by the sleeve 24 and kept in position thereby, are desirably furnished with internal flanges 30, fitting the shaft, and they move with the sleeve by reason of the entrance of their ears within the notches of the slides.

The slides have a limited longitudinal movement sufficient to force the clutching-rings together, and thus cause them to act on the hubs of the pinions, and this movement is imparted to them by the key 31 and a sliding rod 32, which lies loosely in an axial recess 33 of the shaft 14. The key passes transversely through the slides, sleeve, shaft, and rod and is fast in the slides and rod; but in the sleeve and shaft it is free to move longitudinally of those devices, as will be seen at 34. The rod 32 is given longitudinal movements as follows: At its outer end it is provided with a grooved collar 35, which the forked end of a lever 36 engages. The lever 36 is pivoted at 37, and below the pivot an arm 38 extends from the lever to a junction with a short arm or crank 39, projecting laterally from a vertical rock-shaft 40. Said rock-shaft also carries an arm 41, extending from its lower end and in a direction at right angles to arm 39, and this arm carries a block 42, which extends down and into the path of two stops 43 43, mounted upon the side face of a gear 44, secured on the work-holding shaft 18. The stops are preferably adjustable on the gear and slide in the groove 45 thereof and are tightened by set-screws 46. They are also provided with hollow screws 60, in which are arranged contact-pieces 47, which are movable axially through the screws. The openings in the screws are enlarged at one end, and in such enlargements are coiled springs 61, acting on the collars 62 of the contact-pieces, the springs being confined by plugs 63. When the block engages either contact-piece, it compresses the spring 61 and stores power in it which is exerted in throwing the block over beyond the intermediate position at the time of reversal.

The work-holder shaft is actuated by the worm 23, already mentioned, the worm-wheel 48 on shaft 49 meshing with the worm and the pinion 50 on shaft 49 meshing with the gear 44. It will be noticed from the construction set forth that when either of the stops 43 in the rotation of the work-holder shaft comes against the block 42 it will move the block one way or the other, according to which stop engages it. This causes a rocking of shaft 40, and the latter in turn swings lever 36 on its pivot, and thus gives a longitudinal movement to the rod 32 and through it to the slides 25. The movement of the slides closes the half-rings 27 on the hub of one of the pinions—say, for instance, pinion 19—toward which the slides are moved, and at the same time releases the hold upon pinion 20, and thus pinion 19 will be actuated by shaft 14 so long as the clutch remains in action on its hub. When, however, the other stop 43 in the rotation of the work-holder shaft encounters said block 42, it moves the latter in the direction opposite to the direction in which it was moved by the first-mentioned stop and causes a reversal in the rotation of the work-holder shaft by rocking shaft 40 and swinging lever 36 both in the return direction, thus causing the slides 25 to clamp the clutch-rings on the hub of the other pinion 20 and at the same time releasing the rings on the hub of pinion 19, so that the rotation of shaft 22 will be reversed. The next reversal will bring pinion 19 again into action and in the manner first described, and succeeding reversals will be mere repetitions of those described, the slides causing the gripping of the pinions in alternate order.

The rock-shaft also carries an arm 51, having its outer end beveled in opposite directions, and this beveled end engages a spring-pressed stop 52, movably supported in a stationary arm 53. The stop is also beveled off at its end, as shown, so that the arm 51 will be able to force it to yield and allow the arm to move past it when the shaft 40 is rocked, as stated. Between the rocking operations the spring-stop possesses sufficient power to hold the rock-shaft stationary and keep the slides in action, thus preventing any tendency the slides may have to move back from the pinion which is being clutched.

The lever 36 may also be operated by hand whenever necessary through the medium of the hand-lever 55 and connecting-rod 56, and thus effect the reversal of the work-shaft at irregular periods when that is necessary.

I claim—

1. A reversing-clutch wherein are combined two tapering hubs, a shaft on which the hubs are mounted, ring-sections inclosing each hub and provided with outward projections at their ends, slides having tapering notches at their ends adapted to engage projections upon the ring-sections, means for moving the slides back and forth between the hubs so that they may close the sections of each alternately, and means for opening the ring-sections after they are released by the slides.

2. The combination with a reversing-clutch essentially such as that described, of a vertical rock-shaft controlling the clutch, an arm 51 projecting horizontally from the shaft and a yielding stop 52 encountering said arm and moving endwise, substantially as specified.

3. The combination with a reversing-clutch essentially such as that described, of a rock-shaft controlling the clutch, an arm 51 projecting from the shaft and having its end beveled in opposite directions and a yielding stop 52 encountering said arm, and having its end similarly beveled and yielding to allow it to pass and acting to hold the shaft stationary between the reversing operations, substantially as specified.

BENJAMIN J. ABBOTT.

Witnesses:
 EDW. S. EVARTS,
 H. M. MUNDAY.